US006668226B2

(12) United States Patent
Sutanto

(10) Patent No.: US 6,668,226 B2
(45) Date of Patent: Dec. 23, 2003

(54) POLAR COORDINATE-BASED ISOCHRONE GENERATION

(75) Inventor: Herry Sutanto, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 227 days.

(21) Appl. No.: 09/975,704

(22) Filed: Oct. 11, 2001

(65) Prior Publication Data

US 2003/0074132 A1 Apr. 17, 2003

(51) Int. Cl.[7] .......................... G01C 21/32; G01C 21/34
(52) U.S. Cl. ...................... 701/208; 701/202; 701/209; 340/995.1; 340/995.19
(58) Field of Search ................................ 701/202, 208, 701/209, 210, 211; 340/990, 995.1, 995.14, 995.19, 995.21

(56) References Cited

U.S. PATENT DOCUMENTS 4,745,550 A * 5/1988 Witkin et al. .................. 702/11
6,401,031 B2 * 6/2002 Ogawa ......................... 701/202
6,424,910 B1 * 7/2002 Ohler et al. .................. 701/202
6,587,785 B2 * 7/2003 Jijina et al. .................. 701/210
2003/0014286 A1 * 1/2003 Cappellini ....................... 705/5

* cited by examiner

Primary Examiner—Gary Chin
(74) Attorney, Agent, or Firm—W. Scott Petty; King & Spalding LLP

(57) ABSTRACT

The present invention utilizes a novel polar coordinate grid to improve the processes of calculating and generating isochrones. Isochrones are lines on a map connecting places of equal travel time from a particular departure point. Calculating accurate isochrones is time consuming especially for large maps, because of the large number of data points to be processed. Data sampling is used to expedite the generation of isochrones, while maintaining acceptable accuracy. The present invention uses polar coordinate grid sampling for data sampling. Advantageously, polar coordinate grids have higher granularity at the center of a mapped region and lower granularity in regions farther away from the center in radial direction. Polar coordinate sampling reduces the amount of memory used and decreases the isochrone calculation time without perceptible degradation in isochrone accuracy.

28 Claims, 13 Drawing Sheets

POLAR COORDINATE-BASED ISOCHRONE GENERATION

FIELD OF THE INVENTION

The present invention relates to the generation of isochrones and more specifically relates to the improvement of isochrone generation by using polar coordinate-based sampling.

BACKGROUND OF THE INVENTION

Isochrones are lines on a map connecting places of equal travel time from a particular departure point. Isochrones are used by would-be travelers who want to determine what destinations are reachable from a departure point within a predetermined travel time. The calculation and generation of an isochrone can require the consideration and analysis of large amounts of data. While an isochrone can be generated by hand, more recently, isochrone generation has been automated and computerized. Computers are now commonly used to generate isochrones, because of the calculating power of modern computers and the recent availability of mapping data.

Conventional computerized methods of isochrone generation are time consuming especially for large maps, because of the large number of data points to be processed. One way of simplifying the isochrone generation process is to reduce the number of data points to consider for a given map. For example, for a drive time isochrone, only travel times to street intersections (i.e., routing nodes) are calculated, rather than every single point along an entire street. After travel times are associated with all of the intersections in a mapped region, the isochrone is then generated by creating a Voronoi diagram of those points. That is, an isochrone is created that includes all intersections reachable within the drive time and that excludes all intersections not reachable within the drive time. In a mapped region having a high road density (e.g., a city center), the number of intersections can significantly slow isochrone generation.

Creating a Voronoi diagram is an expensive process (i.e., consumptive of system resources), especially if the number of intersections (i.e., data points) is large. To expedite isochrone generation, the number of data points needs to be reduced, hopefully without affecting the shape of the boundary. One way to do this is to employ grid-based data sampling of the data points before Voronoi diagram is calculated.

Data sampling is used to increase the speed the generation of isochrones by reducing the number of points on a map that must be considered when determining the location of the isochrone. A uniform size rectangular grid can be used to sample the points. Thus, multiple data points inside a grid cell are replaced with one point at its center. Conventional isochrone generation methods use a Cartesian coordinate grid sampling. In such methods, a rectangular grid is laid over the mapped region and the isochrone is drawn to separate cells in the grid. While Cartesian-based grid sampling has made computerized isochrone generation more efficient, isochrone generation can still be highly consumptive of a computer's processor and memory resources.

Another approach to expediting isochrone generation involves adjusting the grid's cell size, based on the area of the requested isochrone. Typically, the larger the isochrone, the larger the grid cell size. However, a larger grid cell size reduces the accuracy (i.e., lowers the granularity) of the isochrone boundary. This is often acceptable because larger isochrones (i.e., longer drive time) can generally tolerate more error (i.e., the drive time for a longer distance is inherently less accurate).

However, this approach to expediting isochrone generation has some drawbacks: 1) the size of the overall mapped region must be determined before setting the grid size, and 2) the sampling done for a large isochrone cannot be used for calculating a smaller isochrone (i.e., the sampling must be re-created for every different size of isochrone).

Therefore, there is a need in the art for an isochrone generation system and method that utilizes a polar coordinate grid for data sampling to make isochrone generation faster and more efficient. The isochrone generation system and method also should reduce the amount of memory needed to perform isochrone generation by reducing the required number of data points for storage during the isochrone generation process.

SUMMARY OF THE INVENTION

The present invention utilizes a novel polar coordinate grid to improve the processes of calculating and generating isochrones. Isochrones are lines on a map connecting places of equal travel time from a particular departure point. Calculating accurate isochrones is time consuming especially for large maps, because of the large number of data points to be processed. Data sampling is used to speed the generation of isochrones, while maintaining acceptable accuracy. The present invention uses polar coordinate grid sampling for data sampling. Conventional Cartesian coordinate grid sampling processes use uniform rectangular grids. Advantageously, polar coordinate grids have higher granularity at the center of a mapped region and lower granularity in regions farther away from the center in radial direction. Polar coordinate sampling reduces the amount of memory used and decreases the isochrone calculation time without perceptible degradation in isochrone accuracy.

In one aspect of the invention, a method is provided for generating an isochrone in a mapped region, where the mapped region has a departure point and a predetermined travel time. A travel time is associated with each of a plurality of routing nodes in the mapped region. At least one travel time data point is created, where the travel time data point corresponds to a polar grid cell in which at least one of the plurality of routing nodes resides. A line is drawn between a first travel time data point and a second travel time data point, where the first travel time data point can be reached from the departure point within the predetermined travel time and where the second travel time data point cannot be reached from the departure point within the predetermined travel time.

In another aspect of the invention, a system is provided for generating an isochrone for a mapped region having a departure point and a predetermined travel time. The system has a mapping module operative to retrieve map data, to associate a travel time with each of a plurality of routing nodes in the mapped region, and to create at least one travel time data point corresponding to a polar grid cell in which at least one of the plurality of routing nodes resides. The system also has a rendering module operative to draw a line between a first travel time data point and a second travel time data point, where the first travel time data point can be reached from the departure point within the predetermined travel time and the second travel time data point cannot be reached from the departure point within the predetermined travel time.

The various aspects of the present invention may be more clearly understood and appreciated from a review of the

DETAILED DESCRIPTION OF THE EXEMPLARY EMBODIMENTS

The present invention utilizes a novel polar coordinate grid to improve the processes of calculating and generating isochrones. Isochrones are lines on a map connecting places of equal travel time from a particular departure point. Calculating accurate isochrones is time consuming especially for large maps, because of the large number of data points to be processed. Data sampling is used to speed the generation of isochrones, while maintaining acceptable accuracy. The present invention uses polar coordinate grid sampling for data sampling. Conventional Cartesian coordinate grid sampling processes use uniform rectangular grids. Advantageously, polar coordinate grids have higher granularity at the center of a mapped region and lower granularity in regions farther away from the center in radial direction. Consequently, the polar coordinate sampling of an exemplary embodiment of the present invention reduces the amount of memory used and decreases the isochrone calculation time without perceptible degradation in isochrone accuracy.

An Exemplary Operating Environment

Figure 1:
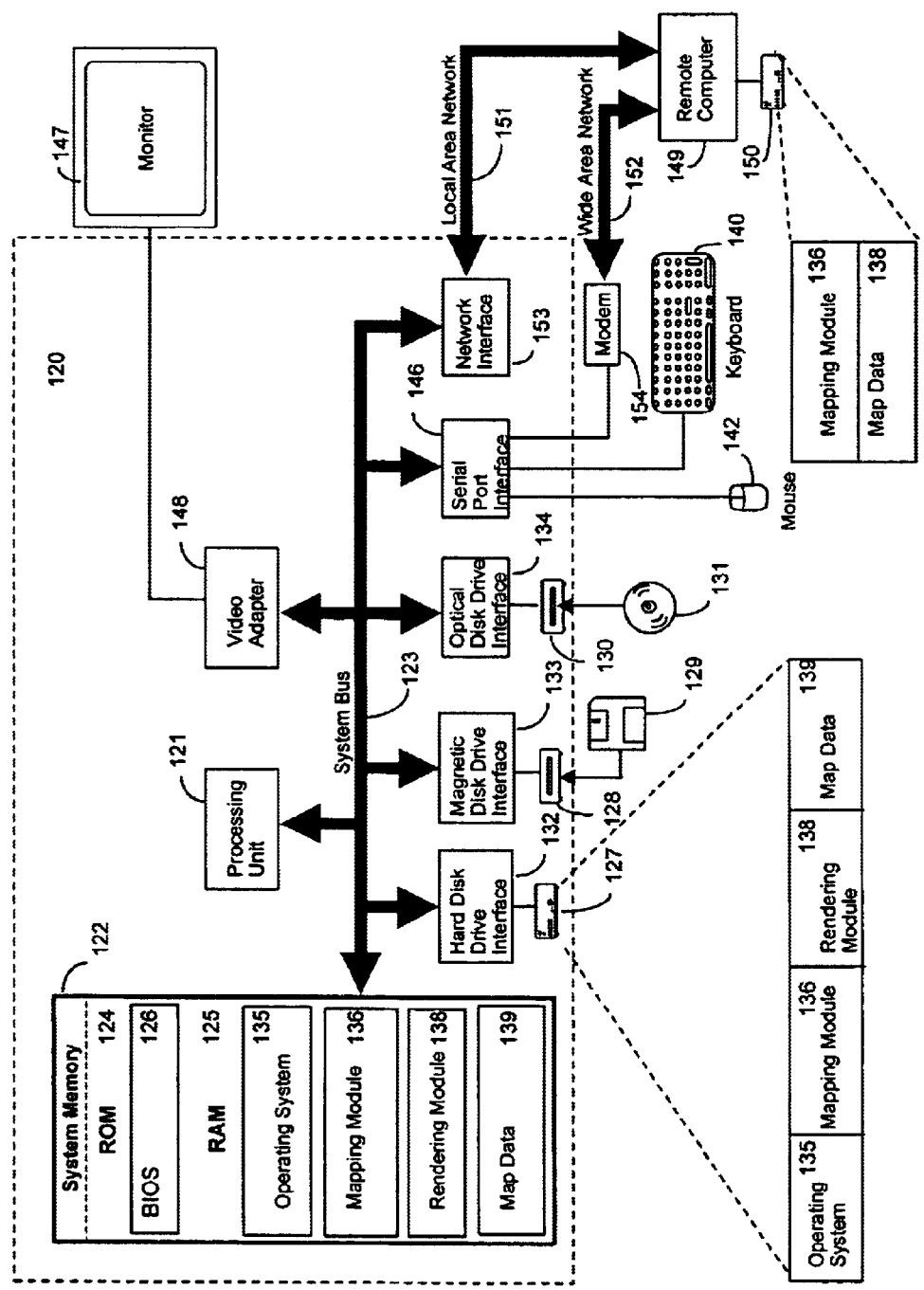
FIG. 1 is a block diagram illustrating an exemplary operating environment for implementation of various embodiments of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a mapping module 136, a rendering module 138, and a map data module 139. Program modules include routines, sub-routines, programs, objects, components, data structures, etc., which perform particular tasks or implement particular abstract data types. Aspects of the present invention may be implemented in the form of a mapping module 136 that can operate in concert with the rendering module 138 and the map data module 139. The mapping module 136 generally comprises computer-executable instructions for creating or displaying geographical maps. The rendering module 138 generally comprises computer-executable instructions for displaying maps generated by the mapping module 136 and can include rendering devices such as a video monitor or a printer. The rendering module 138 is generally accessible to the mapping module 136, but also can be implemented as an integral part of the mapping module.

A user may enter commands and information into personal computer 120 through input devices, such as a keyboard 140 and a pointing device 142. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in the figure. The logical connections depicted in the figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
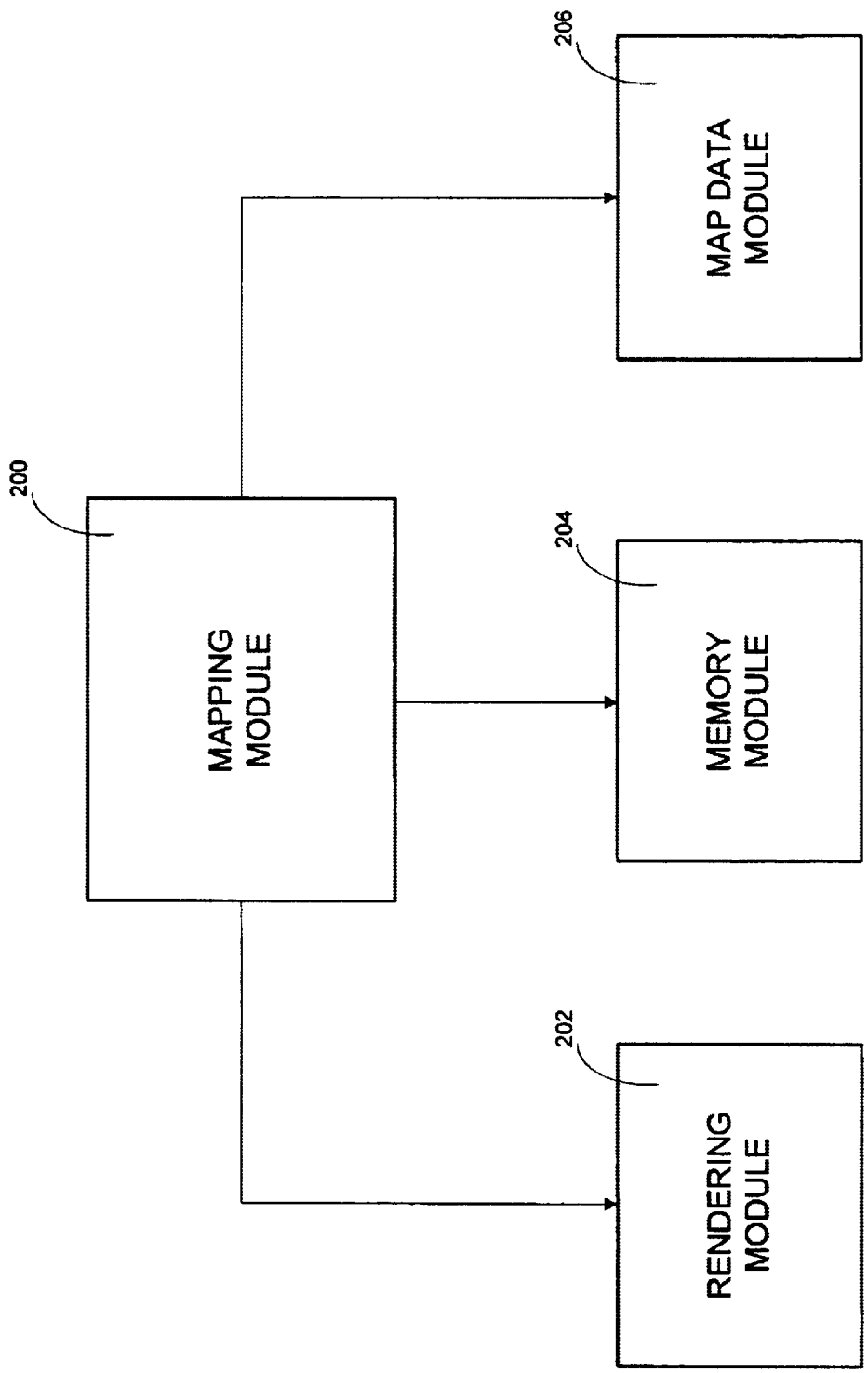
FIG. 2 is a block diagram depicting the primary functional components of an exemplary embodiment of the present invention.

FIG. 2 is a block diagram depicting the primary functional components of an exemplary embodiment of the present invention. A mapping module 200 can be used for various mapping functions such as best route calculations, drive time calculations, and for generating graphical depictions of a map. In an exemplary embodiment of the present invention, the mapping module 200 also can generate isochrones. An isochrone is a line on a map connecting destination points of equal travel time from a given departure point. Generally, the area of a map inside an isochrone represents the destination points in the mapped region that can be reached within a certain time by traveling in a given manner. Typically, the map will include a depiction of a network of roads. In this case, the isochrone calculations will be based on drive time information associated with each road that can be utilized between the departure point and each destination point. Those skilled in the art will appreciate that an isochrone could be made for other forms of travel, besides road-based travel. For example, an isochrone could be created for flight times, taking into account wind speeds and other travel-related factors.

The mapping module can obtain travel time information from a map data component 206. The map data component may be simply a database containing information regarding average travel times along roads in a mappable region. Notably, a particular road may include various drive time data associated with different portions of the road. The drive time associated with an urban stretch of road may be significantly longer over the same distance as compared to a rural portion of the same road. The mapping module 200 can calculate the best path between the departure point and each destination point by comparing various routes between the points. The data used by the mapping module 200 can be stored in the map data module 206. Those skilled in the art will appreciate that various other data pertaining to a particular map can be stored in the map data module 206.

When the mapping module 200 is used to create an isochrone, the mapping module 200 can receive as input a particular map choice, a departure point, and a trip time parameter. The mapping module 200 can access the map data module 206 to retrieve map data relating to the mapped region corresponding to the departure point and can perform the necessary calculations to create an isochrone from the map data in the map data module 206 and the input information. That is, an exemplary mapping module 200 will calculate the boundaries of an isochrone defining the region surrounding the departure point that can be reached within the input travel time.

The mapping module 200 can use a memory module 204 to store calculated data. For example, the mapping module 200 may, as an intermediate step, calculate all travel times to all known intersections within a mapped region. The travel time associated with each known intersection could be temporarily stored in the memory module 204 until the travel time information is needed for isochrone calculation. The memory module 204 may be an area of memory in the ram 125 (FIG. 1) and/or a portion of a non-volatile memory, such as hard drive 127 (FIG. 1). Those skilled in the art will appreciate that there are various means for implementing memory that could be used to store the data useful for processing an isochrone. Notably, memory resources are typically finite and valuable. Consequently, it is desirable to minimize the memory required to create and process an isochrone.

Once an isochrone has been generated by the mapping module 200, in cooperation with the memory module 204 and the map data module 206, the isochrone can be rendered using a rendering module 202. The rendering module 202 may be a combination of devices and/or program modules used for producing a visual display such as a computer video card and a computer monitor. Alternatively, the rendering device 202 may be a printer for producing a paper based rendering of an isochrone. Those skilled in the art will appreciate that various means of rendering an isochrone could be used to implement various embodiments of the present inventions.

Figure 3:
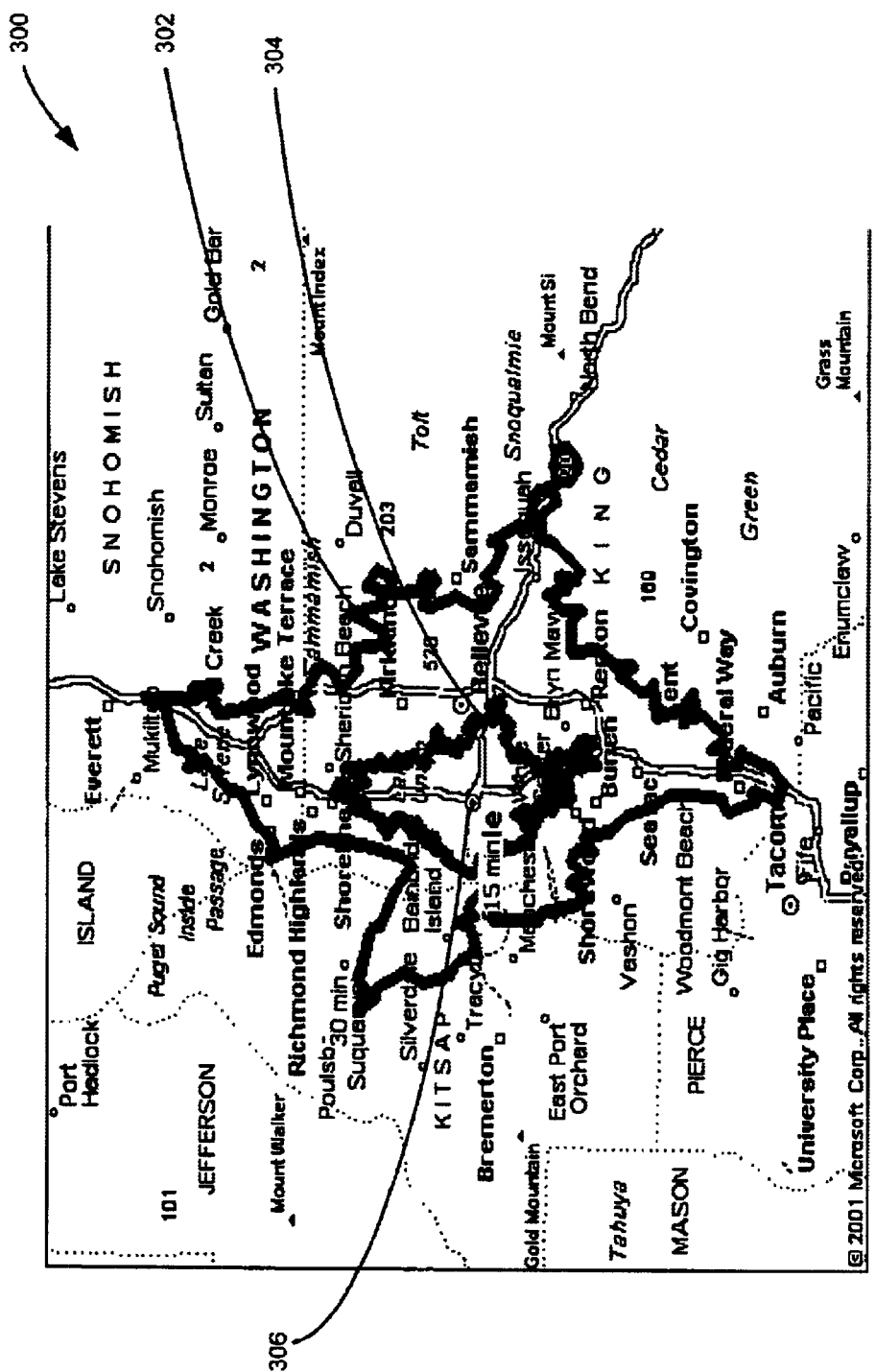
FIG. 3 is a graphical depiction of a mapped region including two exemplary isochrones.

FIG. 3 is a graphical depiction of a mapped region 300 including two isochrones 302, 304. The isochrones 302, 304 represent thirty minute and fifteen minute drive times, respectively. These drive times are calculated with reference to a departure point 306.

Each point within the thirty minute isochrone 302 can be reached within thirty minutes when travelling by car from the departure point 306. Similarly, any point within the fifteen minute isochrone 304 can be reached within fifteen minutes of leaving the departure point 306 by car. As described above, the isochrones 302, 304, can be calculated by first calculating a drive time to each intersection within the mapped region 300 and then by determining which of those intersections can be reached within the predetermined drive time. Each intersection for which the drive time is precisely equal to the predetermined drive time can be identified as a point on the isochrone. After each intersection that is an isochrone point has been identified, the isochrone can be created by including all of those points that are reachable within the determined drive time and excluding all of those points that are not reachable within the determined drive time.

Figure 4:
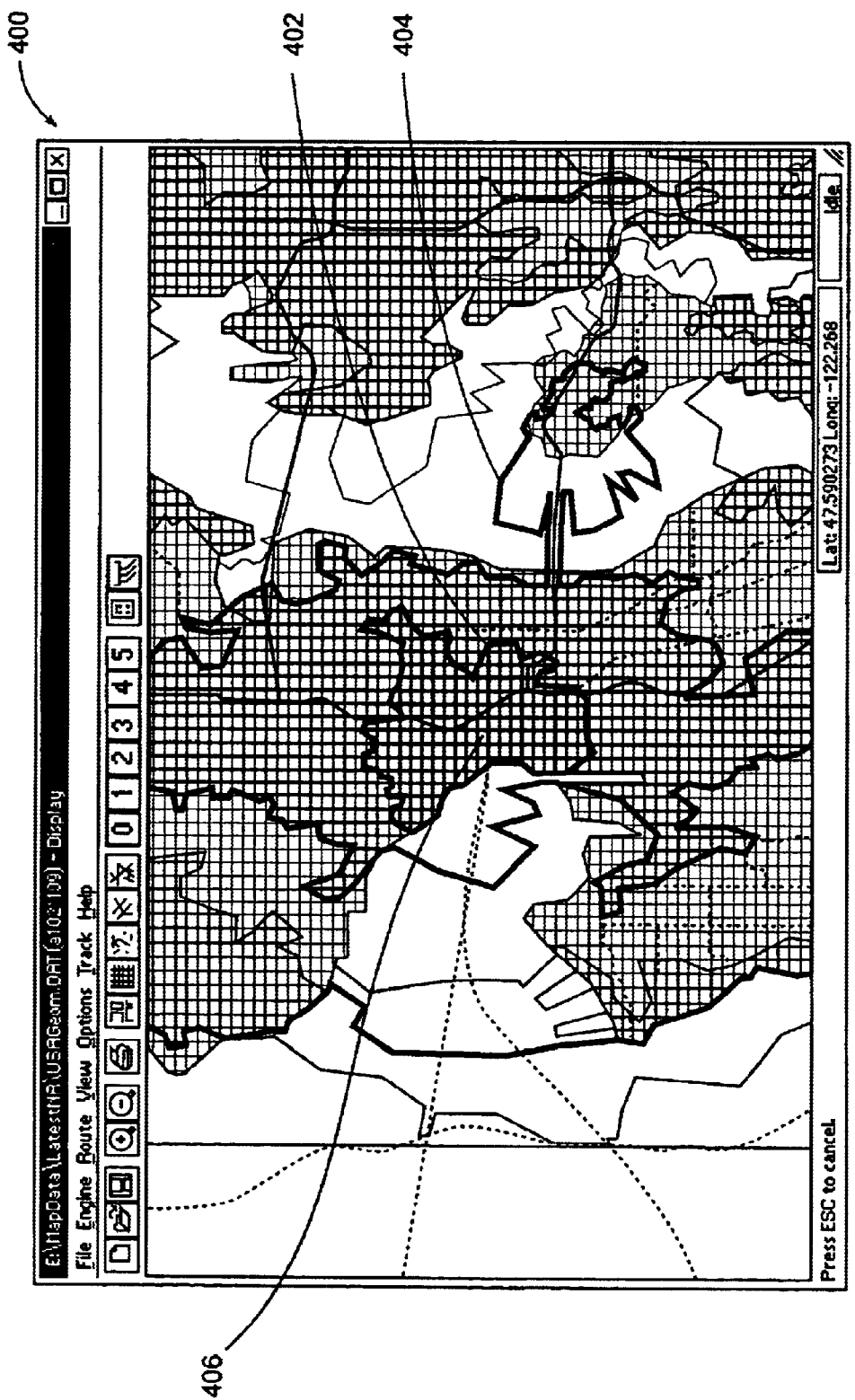
FIG. 4 is a graphical representation of a mapped region including a series of exemplary isochrones.

FIG. 4 is a graphical representation of a mapped region 400 including a series of isochrones 402, 404. The mapped region 400 depicted in FIG. 4 as a grid pattern overlaying the entire mapped region. The grid pattern can be used to facilitate the creation of an isochrone in the mapped region 400. The isochrones are generated around a predetermined departure point 406. By identifying cells within the grid pattern that contain isochrone points, the process of generating an isochrone can be simplified.

The association of a grid cell with an isochrone point is referred to as sampling. One way of identifying a grid cell as an isochrone point is to determine whether the grid cell has at least one intersection therein that should be on the border of the isochrone (i.e., the travel time from the departure point to the intersection is precisely the predetermined drive time). Another way of characterizing a grid cell is by averaging the drive times associated with each of the intersections within the grid cell. If the average of all of the intersections is within a predetermined tolerance of the predetermined drive time, then the cell can be identified as an isochrone point. Obviously, using the grid depicted in FIG. 4, each grid cell will include an equal geographic region.

Referring back to FIG. 2, the mapping module 200 can be used to process the mapped region 400 on a cell-by-cell basis, after drive times have been associated with each of the intersections in the mapped region 400. Once all of the cells in the mapped region have been characterized as either within the isochrone or without the isochrone, an isochrone boundary can be generated dividing each cell.

Figure 5:
FIG. 5 is a graphical representation of a mapped region that has been overlaid with a Cartesian grid for drive time data sampling.

FIG. 5 is a graphical representation of a mapped region 500 that has been overlaid with a Cartesian grid 502 for drive time data sampling. Street intersections are identified by data points 550–556 within a selected region 504. The selected region 504 is simply used to identify a portion of the mapped region 500 for the purposes of describing the invention and is not used in an exemplary isochrone generation process. As described above, the intersections 550–556 identify intersections within the mapped region that are to be considered for the purposes of generating an isochrone around a departure point (not shown).

Drive times are calculated between the departure point and each intersection. For any given predetermined drive time, some intersections will be within the predetermined drive time and some intersections will be outside the predetermined drive time. In a mapped region that is densely populated with streets, the number of intersections can limit the ability of an isochrone generation process to efficiently generate an isochrone.

In cases where there are more than one intersection within a mapped region (e.g., grid cell 570), a Cartesian grid can be used to reduce the number of data points to consider when calculating the proper points (e.g., intersections) to include and exclude. A single data point can be used to represent all of the intersections within a particular grid cell 570–574. For example, the single sampled data point can be represented by the longest drive time value associated with the grid cell. A single sampled data point can be placed at the center of the grid cell and can be associated with the longest of the intersection drive times. Those skilled in the art will appreciate that alternative methods can be used to associate values to a sampled data point. For example, the drive times associated with all of the intersections within a grid cell can be averaged, the shortest drive time value associated with the grid cell could be used, or any other drive time value representative of the intersections within the grid cell could be used.

After the sampling step has been performed, each grid cell can be represented by a single data point. An isochrone can then be generated by drawing a line between all data points that should be included within the isochrone and those that should be outside of the isochrone. Data points associated with drive times greater than the predetermined drive time should be included within the isochrone. Data points associated with drive times less than the predetermined drive time should be excluded from the isochrone. As described in more detail in connection with FIGS. 9–13, a Voronoi diagram can be used to generate an isochrone that accurately divides the data points.

Figure 6:
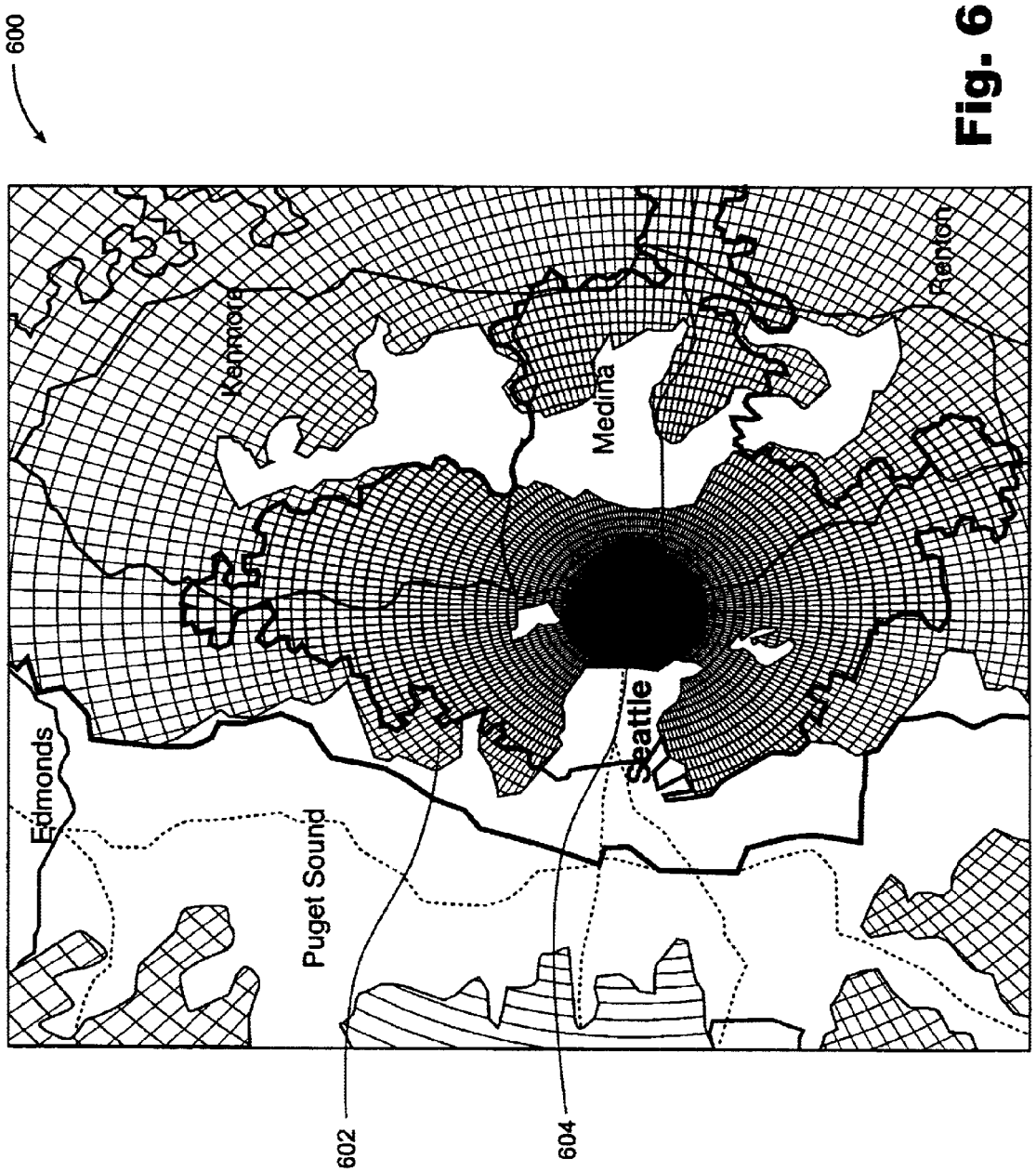
FIG. 6 is a graphical depiction of a mapped region overlaid with a polar coordinate grid that is an exemplary embodiment of the present invention.

FIG. 6 is a graphical depiction of a mapped region 600 overlaid with a polar coordinate grid that is an exemplary embodiment of the present invention. An isochrone 602 has been generated for the mapped region 600. As discussed above, the isochrone 602 represents all of the intersections and/or data points within the mapped region that can be reached from a departure point 604 within a predetermined drive time. However, unlike the Cartesian sampling grid depicted in FIGS. 4 and 5, the grid that has been overlaid on the mapped region 600 is a polar coordinate grid, with the origin of the polar grid co-located with the departure point of the mapped region. The polar grid depicted in FIG. 6 has non-uniform grid cells, because polar grid cells that are located further from the departure point (i.e., the origin of the polar grid) have larger areas and represent larger geographical areas than those located near the departure point.

Figure 7:
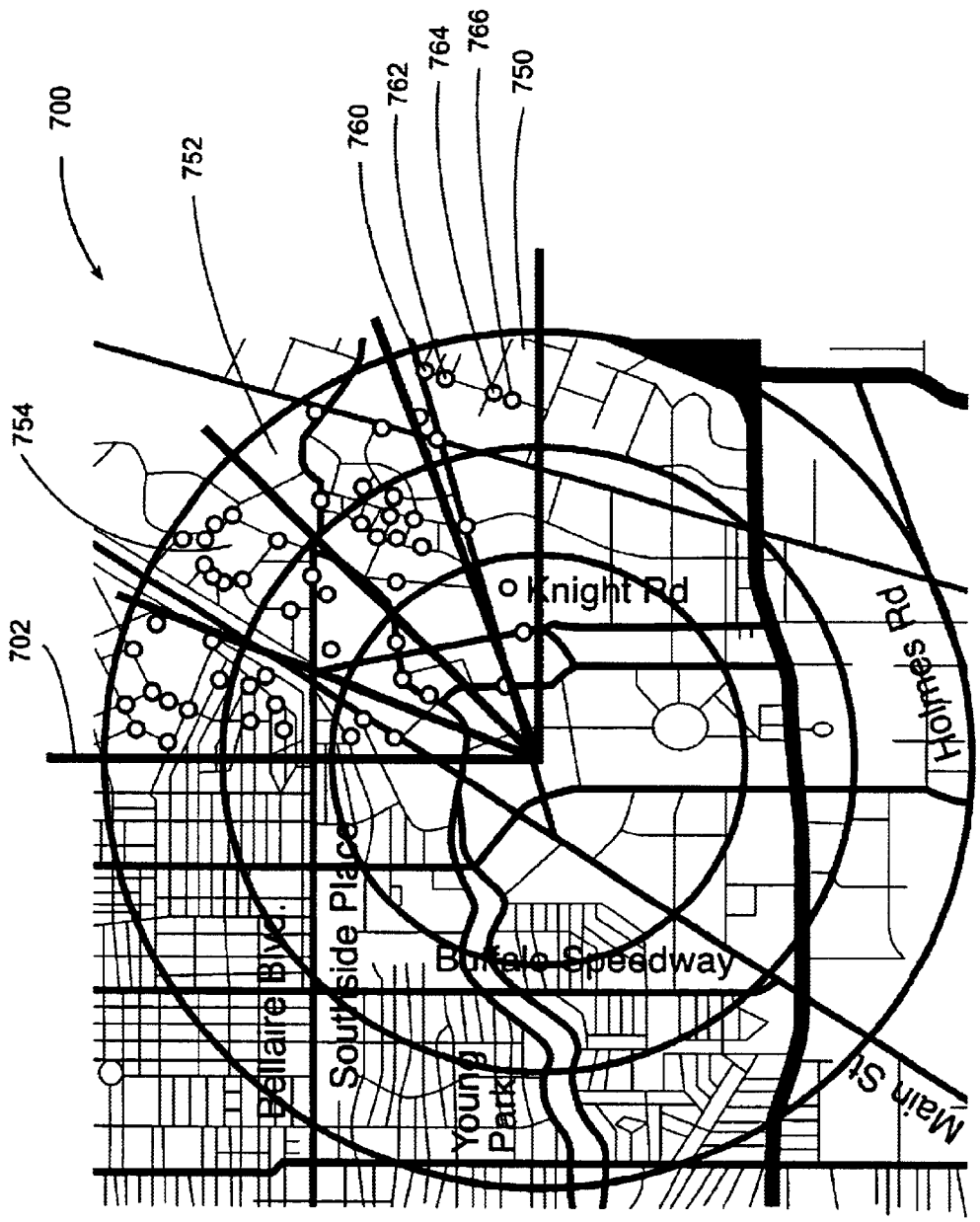
FIG. 7 is a simplified graphical representation of an exemplary polar grid overlaid on a mapped region.

FIG. 7 is a simplified graphical representation of an exemplary polar grid 702 overlaid on a mapped region 700. Only one quadrant of the polar grid 702 is depicted for the sake of graphical simplicity. Each polar grid cell 750–754 has several identified intersections located therein (e.g., 760–766). As described above, the intersections within each polar grid cell can be processed so that each polar grid cell is represented by a single data point, rather than several intersections.

For a hypothetical mapped region, in which the intersections are uniformly distributed, a polar grid cell near the origin (e.g., 710) will have fewer intersections than a polar grid cell further from the origin (e.g., 750). Indeed, this will be generally true in the case of a real mapped region. This is one of the advantages with using a polar grid for data sampling. As compared to Cartesian grid sampling, polar grid sampling further reduces the number of data points that must be considered when generating an isochrone for a mapped region. By reducing the number of data points, the demand on system resources (e.g., memory, processor time) are reduced in a computerized implementation of an exemplary embodiment of the present invention.

Figure 8:
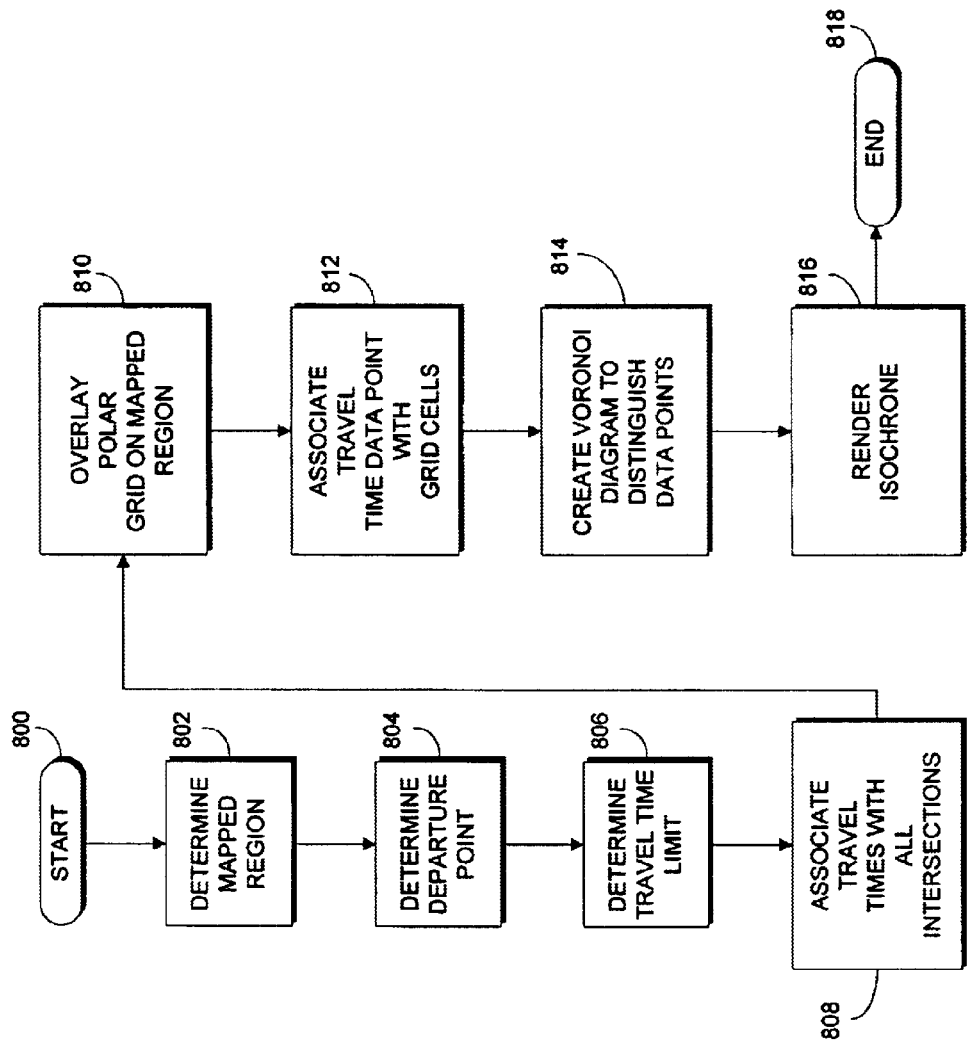
FIG. 8 is a flowchart depicting a method for generating an isochrone that is an exemplary embodiment of the present invention.

FIG. 8 is a flowchart depicting a method for generating an isochrone that is an exemplary embodiment of the present invention. The method begins at start block 800 and proceeds to step 802. At step 802, the mapped region is determined. The mapped region can be determined in various ways. In an exemplary embodiment of the present invention, this step can be performed by accepting an address of a departure point. Of course, the mapped region can be determined as a function of the departure point and of the drive time.

The method of FIG. 8 proceeds from step 802 to step 804. At step 804, the departure point is determined. In an exemplary embodiment of the present invention, this step is performed by receiving user input indicating a desired departure point. This input may take the form of an entered address or a mouse click on a point on a previously rendered mapped region. In an alternative embodiment, the departure point can be received from another process or program module. For example, a mapping module may receive an instruction to generate an isochrone from a road atlas program module. Such an instruction may include an indication of a departure address.

The method then proceeds to step 806, wherein a drive time is determined. As with the departure point, the drive time may be received from a user or as part of an instruction received from another program module. After the mapped region, the departure point, and the drive time have been determined, the isochrone can be generated. The method proceeds from step 806 to step 808.

At step 808, travel times are determined for all intersections in the mapped region. In an exemplary embodiment of the present invention, a Mapping Module (e.g., 200, FIG. 2) can be used to perform this step. The Mapping Module can identify every intersection in the mapped region and can then calculate a drive time between the identified intersections and the departure point. The drive times can be calculated by first obtaining map data from a Map Data Module (e.g., 202, FIG. 2). Once drive times have been associated with all of the intersections in the mapped region, the isochrone can be generated.

The method of FIG. 8 proceeds from step 808 to step 810. At step 810, a polar grid is overlaid on the mapped region. The method then proceeds to step 812 and travel times are associated with each of the grid cells in the polar grid. Steps 808, 810 and 812 can be performed in concert. The individual intersection drive times can be considered as a routing node, representing the location of the intersection and the travel time associated thereto. Polar coordinates are then calculated to identify the location of each routing node with respect to the departure point (i.e., the origin of the polar grid). Thus, if the departure point is represented as coordinate pair latitude$_0$, longitude$_0$, then a routing node can be represented as latitude$_n$, longitude$_n$. The polar coordinates of the routing node is represented as r, θ, where:

$r = \sqrt{(x^2 + y^2)}$ $\theta = \text{atan}(y, x)$ $x = \text{longitude}_n - \text{longitude}_0$; and $y = \text{latitude}_n - \text{latitude}_0$.

After the polar coordinates for each routing node are calculated, the polar grid can be defined. First, the scalar space (i.e., r axis) and the angular space (i.e., θ axis) can be divided into grid cells. The divisions can be uniform along each axis. For example, a grid cell can be defined every two degrees along the θ axis and every 20 meters along the r axis. Alternatively, the divisions can be made non-uniformly in one or both axes. For example, the grid cells can be defined with progressively larger grid sizes along the r axis. For progressively larger polar grid sizes, the size of the $i^{th}$ grid along the r axis can be determined by:

$\pi(i) = \pi_0 + i \times \rho$ where $\pi(i)$ is the size of the $i^{th}$ grid in the r axis, $\pi_0$ is the initial grid size, and $\rho$ is the incremental resolution increase at each step along the r axis. Notably, while the larger polar grid cells reduce isochrone accuracy, it will normally only affect the outer limits of a mapped region (i.e., for longer drive time isochrones). This does not present a significant obstacle to the isochrone generation process, because longer drive time isochrones are inherently less accurate than shorter drive times.

The polar grid cells can be associated with a single travel time using a data sampling process. As described above in connection with Cartesian grid sampling, the single drive time value can be determined in various ways, including determining a longest drive time, a shortest drive time, or an averaged drive time. A single drive time value can be assigned to each polar grid cell. Advantageously, this assignment reduces the number of data points that must be considered when generating an isochrone to separate drive times that belong within the isochrone from those that belong outside the isochrone. Moreover, because polar grid cells are larger, the further they are from the origin, less memory is required to store the information associating the drive time to the grid cell.

The method of FIG. 8 proceeds from step 812 to step 814. At step 814, a Voronoi diagram is created to separate the drive time data points. Voronoi diagrams are a well-known method for dividing points in a plane. A Voronoi diagram has the characteristic that for each data point plotted therein, every other point in the region around that data point is closer to that data point than to any other data point in the diagram. Thus, the Voronoi diagram can be used to calculate the location of an isochrone that properly separates included data points from excluded data points. The use of Voronoi diagrams in this context is described in more detail in connection with FIGS. 9–13.

After the Voronoi diagram is created to accurately separate included data points from excluded data points, the method proceeds to step 816. At step 816, the isochrone is rendered. Typically, this step will be performed by generating a graphical representation of the isochrone superimposed over a graphical depiction of the mapped region. As described above, the graphical representations may be rendered in various ways, such as on a computer monitor or in printed form on paper. The method proceeds from step 816 to end block 818 and terminates.

Figure 9:
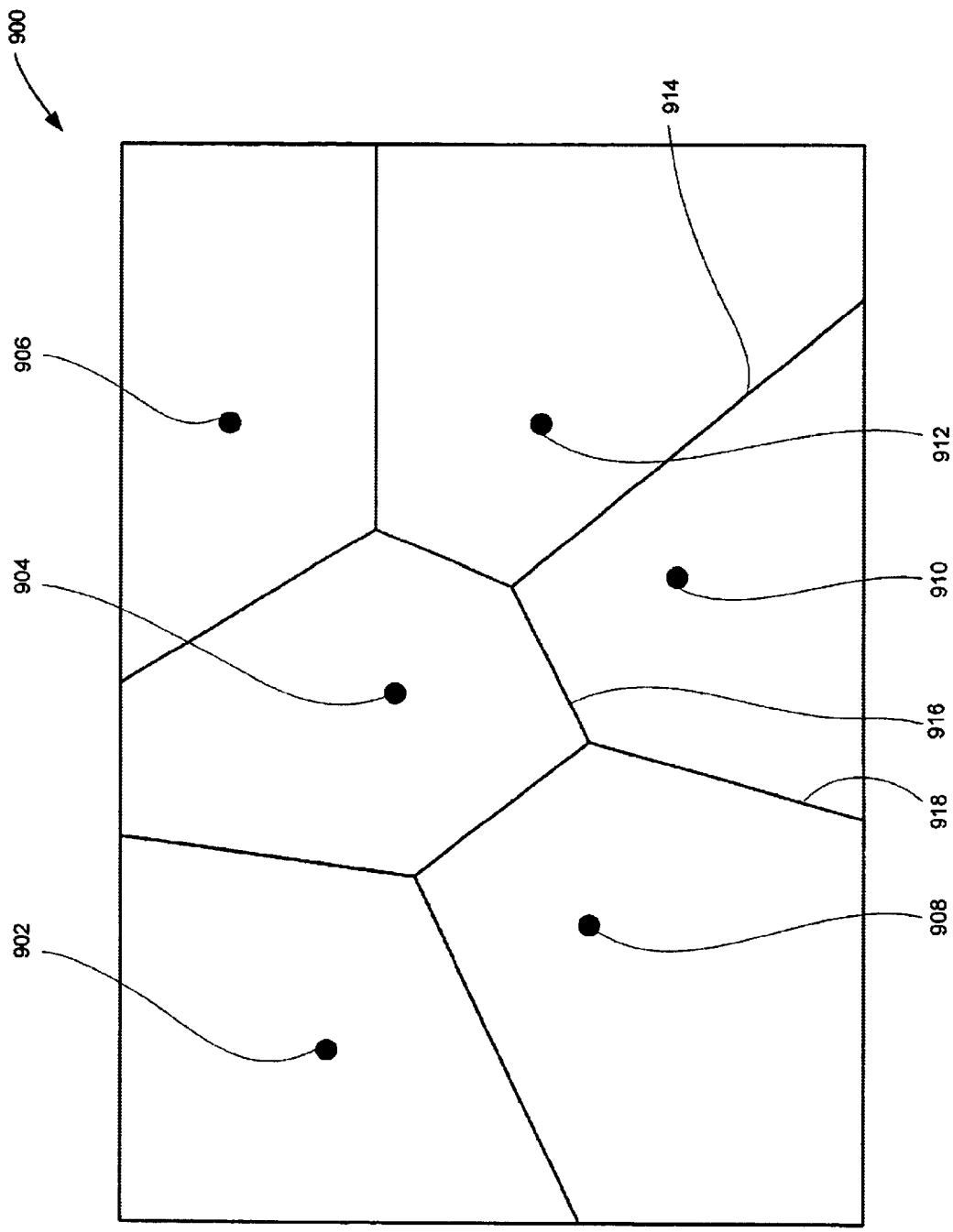
FIG. 9 is a conventional Voronoi diagram depicting the separation of data points plotted on a two-dimensional plane.

FIG. 9 is an exemplary Voronoi diagram 900 depicting the separation of data points 902–912 plotted on a two-dimensional plane. As stated above, the Voronoi diagram has the characteristic that for each data point 902–912 plotted therein, every other point in the region around each data point is closer to that data point than to any other data point in the diagram. In the Voronoi diagram of FIG. 9, a line 914 is drawn between points 912 and 910. Every point along that line is an equal distance from point 912 as it is from point 910. Likewise, every point along line 916 is an equal distance from point 904 as it is from point 910 and every point along line 918 is an equal distance from point 908 as it is from point 910. A Voronoi diagram can, therefore, be used to create a boundary between points that are to be separated.

Applying this concept to the isochrone generation context, it is clear that points that are intended to be included within an isochrone can be separated from points that are to be excluded from an isochrone. Assuming for the sake of discussion that point 910 is an included point and points 904, 908, and 912 are excluded points, then the boundary created by lines 914, 916, and 918 would provide the boundary on which to form an isochrone separating these points.

Figure 10:
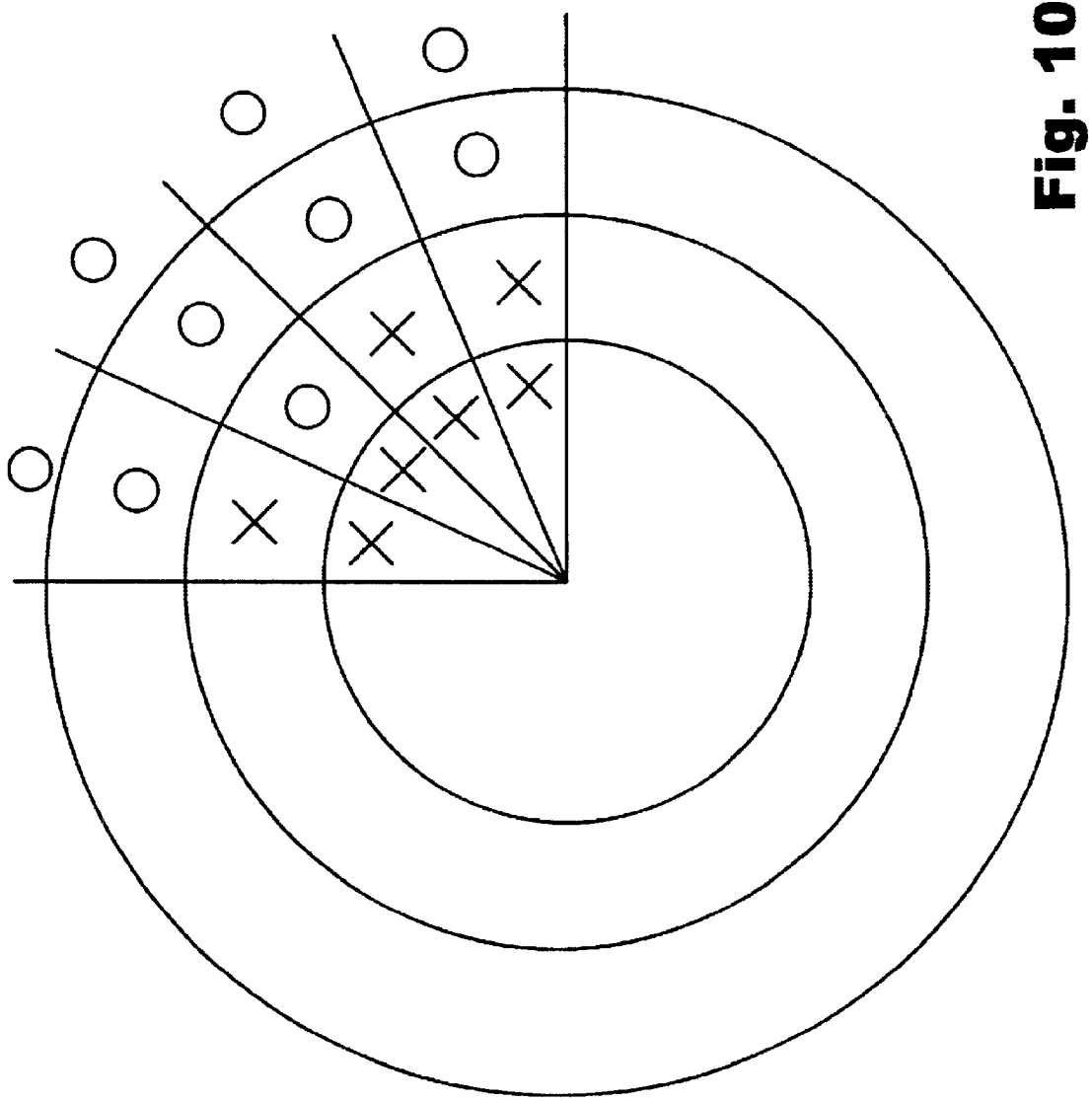
FIG. 10 is a diagram depicting an exemplary plurality of polar grid data points representing travel times for intersections within a plurality of polar grid cells.

FIG. 10 is a block diagram depicting an exemplary plurality of polar grid data points representing travel times for intersections within a plurality of polar grid cells. Polar grid cells having an "X" therein are cells that should be included within the isochrone. Polar grid cells having an "O" marked therein are cells that should be excluded from the isochrone (i.e., represent polar grid cells having an aggregate drive time of more than the predetermined drive time).

Figure 11:
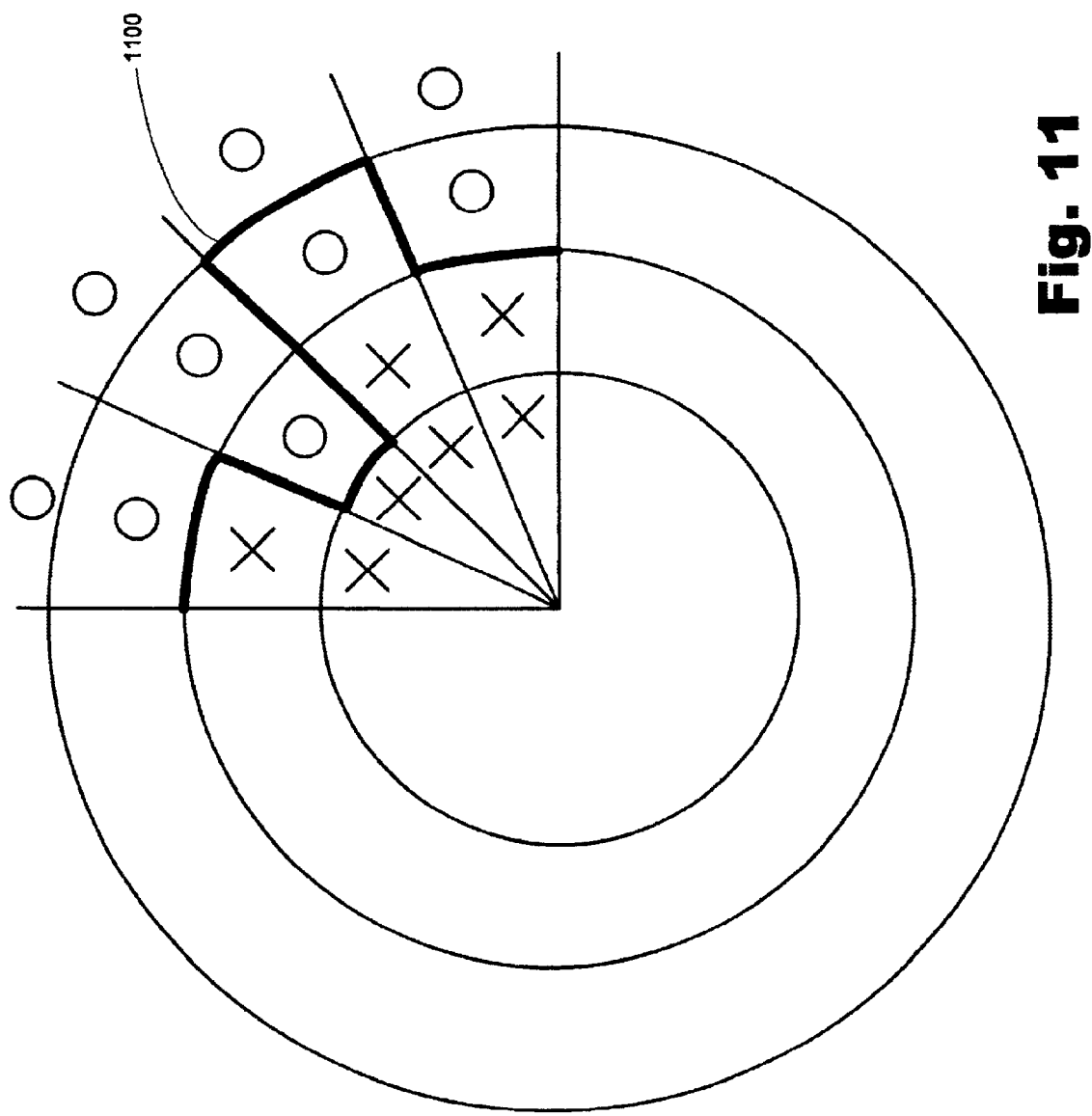
FIG. 11 is a diagram depicting an exemplary plurality of polar grid data points and an exemplary isochrone separating certain data points.

FIG. 11 is a block diagram depicting an exemplary plurality of polar grid data points representing travel times for intersections within a plurality of polar grid cells. The polar grid cells of FIG. 11 also have an isochrone boundary 1100 appropriately separating the polar grid cells. The isochrone 1100 is thus drawn to exclude all grid cells having an aggregate drive time greater than a predetermined drive time and to include all grid cells having an aggregate drive time less than or equal to a predetermined drive time.

While the isochrone 1100 shown in FIG. 11 is depicted as following the grid lines of the mapped region, those skilled in the art will appreciate that this is not an exact representation of the isochrone that would be generated by the described isochrone generation process (i.e., using a Voronoi diagram). A more realisticly represented isochrone 1100 would be comprised of a series of straight sections dividing points within the boundary grid cells, such as a point placed at the center of each grid cell. The isochrone 1100 depicted in FIG. 11 is meant to simplistically represent a divider between included grid cells and excluded grid cells. A similarly simplified isochrone representation is used in FIGS. 12 and 13.

Figure 12:
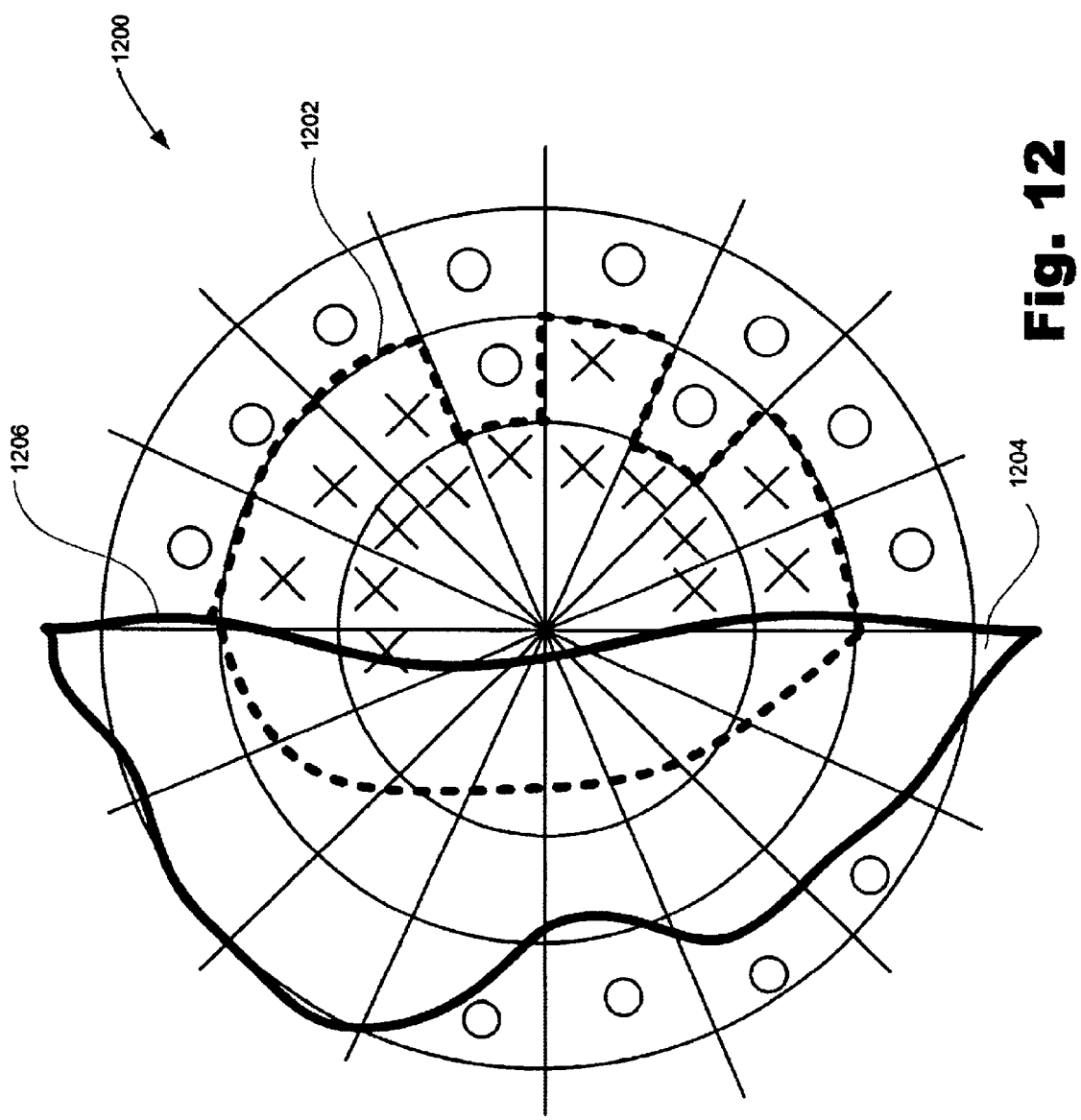
FIG. 12 is a diagram depicting a mapped region having an exemplary isochrone plotted therein.

FIG. 12 is a block diagram depicting a mapped region 1200 having an isochrone 1202 plotted therein. A plurality of polar grid data points are depicted representing travel times for intersections within each of a plurality of polar grid cells. The mapped region 1200 of FIG. 12 includes an impassable region 1204 over which travel is impossible, such as a body of water. Unfortunately, conventional isochrone generation processes are typically unable to conform the isochrone 1202 to such regions. This is primarily caused by the fact that there are no intersections in the impassable region. Because there are no intersections in the impassable region, the Voronoi diagram process does not force the isochrone to "hug" the border of the impassable region 1206. Consequently, it appears that the isochrone is identifying destination points in the impassable region.

Figure 13:
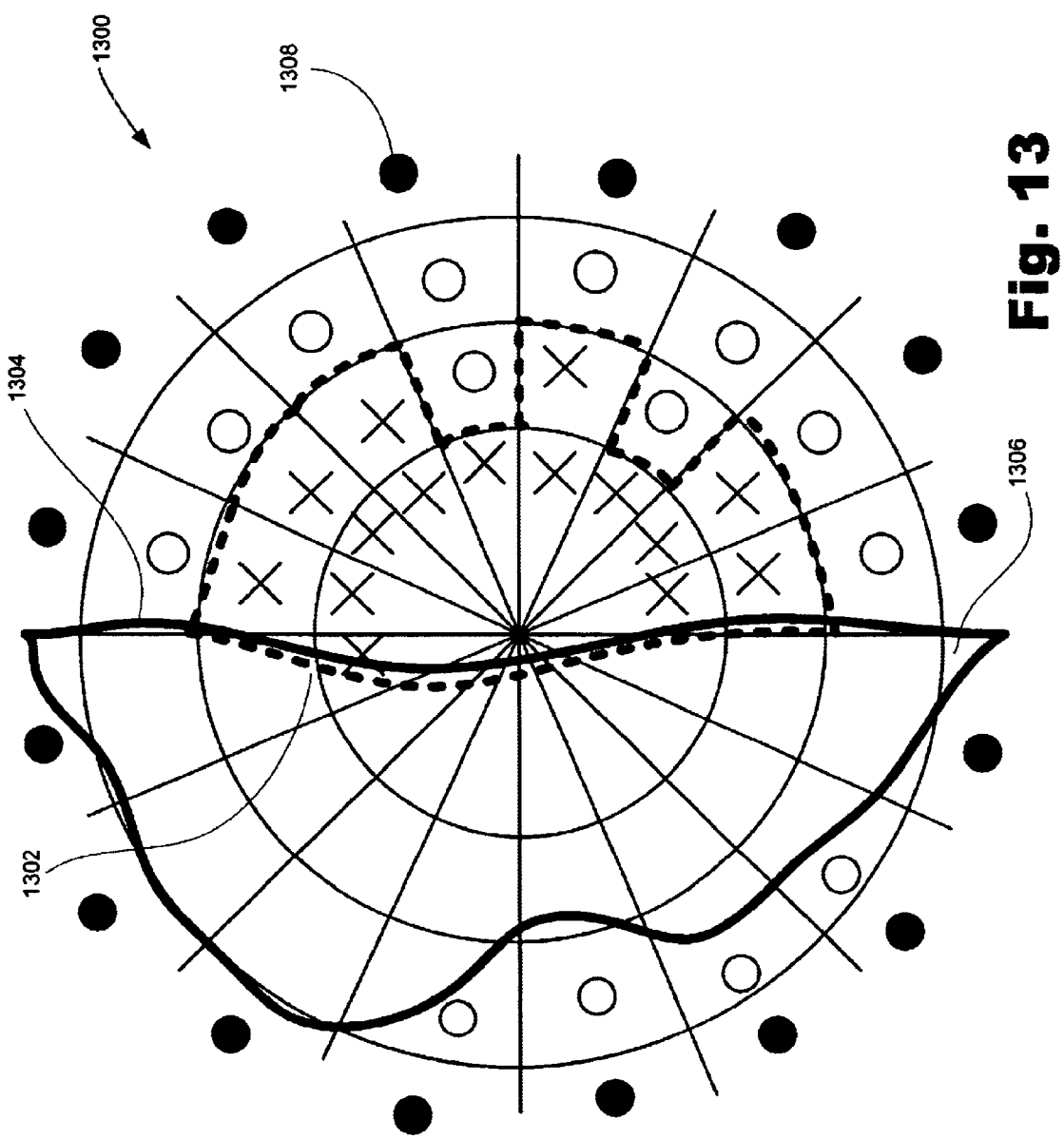
FIG. 13 is a diagram depicting a mapped region having an exemplary isochrone plotted therein.

FIG. 13 is a block diagram depicting a mapped region 1300 having an isochrone 1302 plotted therein. A plurality of polar grid data points are depicted representing travel times for intersections within each of a plurality of polar grid cells. Unlike the isochrone depicted in FIG. 12 (1202), however, the isochrone 1302 depicted in FIG. 13 more closely approximates or hugs the border 1304 of the impassable region 1306. This hugging effect is created by the introduction of additional perimeter Voronoi points (e.g., 1308). In FIG. 13, sixteen perimeter Voronoi points can be added after the data point sampling step described above. By performing the Voronoi diagram process in a reiterative fashion, the perimeter Voronoi points can force the errant portion of the isochrone 1302 to conform to the boundary of the impassable region 1306.

Accordingly, exemplary embodiments of the present invention utilize a novel polar coordinate grid to improve the processes of calculating and generating isochrones. An exemplary embodiment of the present invention uses polar coordinate grid sampling for data sampling. Data sampling reduces the consumption of system memory and resources. Polar coordinate sampling reduces the amount of memory used and decreases the isochrone calculation time without perceptible degradation in isochrone accuracy. Advantageously, polar coordinate grids have higher granularity at the center of a mapped region and lower granularity in regions farther away from the center in radial direction.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for generating an isochrone in a mapped region having a departure point and a predetermined travel time, the method comprising the steps of:
    associating a travel time with each of a plurality of routing nodes in the mapped region;
    creating at least one travel time data point corresponding to a polar grid cell in which at least one of the plurality of routing nodes resides;
    drawing a line between a first travel time data point and a second travel time data point, wherein the first travel time data point can be reached from the departure point within the predetermined travel time and the second travel time data point cannot be reached from the departure point within the predetermined travel time.

2. The method of claim 1, wherein the routing node is a street intersection.

3. The method of claim 1, further comprising the step of storing the travel time associated with each of the plurality of routing nodes in the mapped region.

4. The method of claim 3, further comprising the step of storing the travel time data point associated with the polar grid cell.

5. The method of claim 4, wherein the step of storing the travel time data point further comprises the step of replacing the stored travel time with the travel time data point.

6. The method of claim 1, wherein the step of drawing the line comprises the steps of creating a Voronoi diagram to separate the first travel time data point and the second travel time data point.

7. The method of claim 1, wherein the polar grid cell is one of a plurality of polar grid cells having the departure point as an origin.

8. The method of claim 7, wherein the polar grid cells have different dimensions along a radial axis (r axis).

9. The method of claim 1, wherein the travel time data point represents the highest travel time associated with the at least one routing node residing in the polar grid cell.

10. A method for generating an isochrone in a mapped region having a departure point and a predetermined travel time, the method comprising the steps of:
    associating a travel time with each of a plurality of intersections in the mapped region;
    overlaying a polar coordinate grid on the mapped region, the polar coordinate grid comprising a plurality of polar grid cells;
    creating a plurality of travel time data points, each travel time data point corresponding to one of the plurality of polar grid cells in which at least one of the plurality of intersections resides;
    drawing a line between a first group of travel time data points and a second group of travel time data points, wherein the first group of travel time data points can be reached from the departure point within the predetermined travel time and the second group of travel time data points cannot be reached from the departure point within the predetermined travel time.

11. The method of claim 10, wherein the step of drawing the line comprises the step of creating a Voronoi diagram to separate the first group of travel time data points and the second group of travel time data points.

12. The method of claim 10, further comprising the step of storing the travel time associated with each of the plurality of intersections in the mapped region.

13. The method of claim 12, further comprising the step of storing the travel time data point corresponding to one of the plurality of polar grid cells.

14. The method of claim 13, wherein the step of storing the travel time data point further comprises the step of replacing the stored travel time with the travel time data point.

15. A system for generating an isochrone for a mapped region having a departure point and a predetermined travel time, comprising:
 a mapping module operative to retrieve map data, to associate a travel time with each of a plurality of routing nodes in the mapped region, and to create at least one travel time data point corresponding to a polar grid cell in which at least one of the plurality of routing nodes resides;
 a rendering module operative to draw a line between a first travel time data point and a second travel time data point, wherein the first travel time data point can be reached from the departure point within the predetermined travel time and the second travel time data point cannot be reached from the departure point within the predetermined travel time.

16. The system of claim 15, wherein the map data is retrieved from a map data module.

17. The system of claim 15, wherein the map data is retrieved from a second program module in the form of an instruction.

18. The system of claim 15, wherein the routing node is a street intersection.

19. The system of claim 15, wherein the line is drawn according to a Voronoi diagram process.

20. The system of claim 15, wherein the polar grid cell is one of a plurality of polar grid cells having the departure point as an origin.

21. The system of claim 20, wherein the polar grid cells have different dimensions along a radial axis (r axis).

22. The system of claim 21, wherein a first polar grid cell is located closer to the origin than a second polar grid cell and wherein the r axis dimension of the first polar grid cell is shorter than the r axis dimension of the second polar grid cell.

23. The system of claim 15, wherein the travel time data point represents the highest travel time associated with the at least one routing node residing in the polar grid cell.

24. The system of claim 23, wherein the travel time associated with each of the plurality of routing nodes in the mapped region, is stored in a memory module in association with a location of each of the plurality of routing nodes.

25. The system of claim 24, wherein the time associated with each of the plurality of routing nodes in the mapped region is replaced in the memory module by the travel time data point.

26. The system of claim 15, wherein the travel time data point represents the average travel time associated with the at least one routing node residing in the polar grid cell.

27. The system of claim 26, wherein the travel time associated with each of the plurality of routing nodes in the mapped region, is stored in a memory module in association with a location of each of the plurality of routing nodes.

28. The system of claim 27, wherein the time associated with each of the plurality of routing nodes in the mapped region is replaced in the memory module by the travel time data point.

* * * * *